Figures 1, 2:
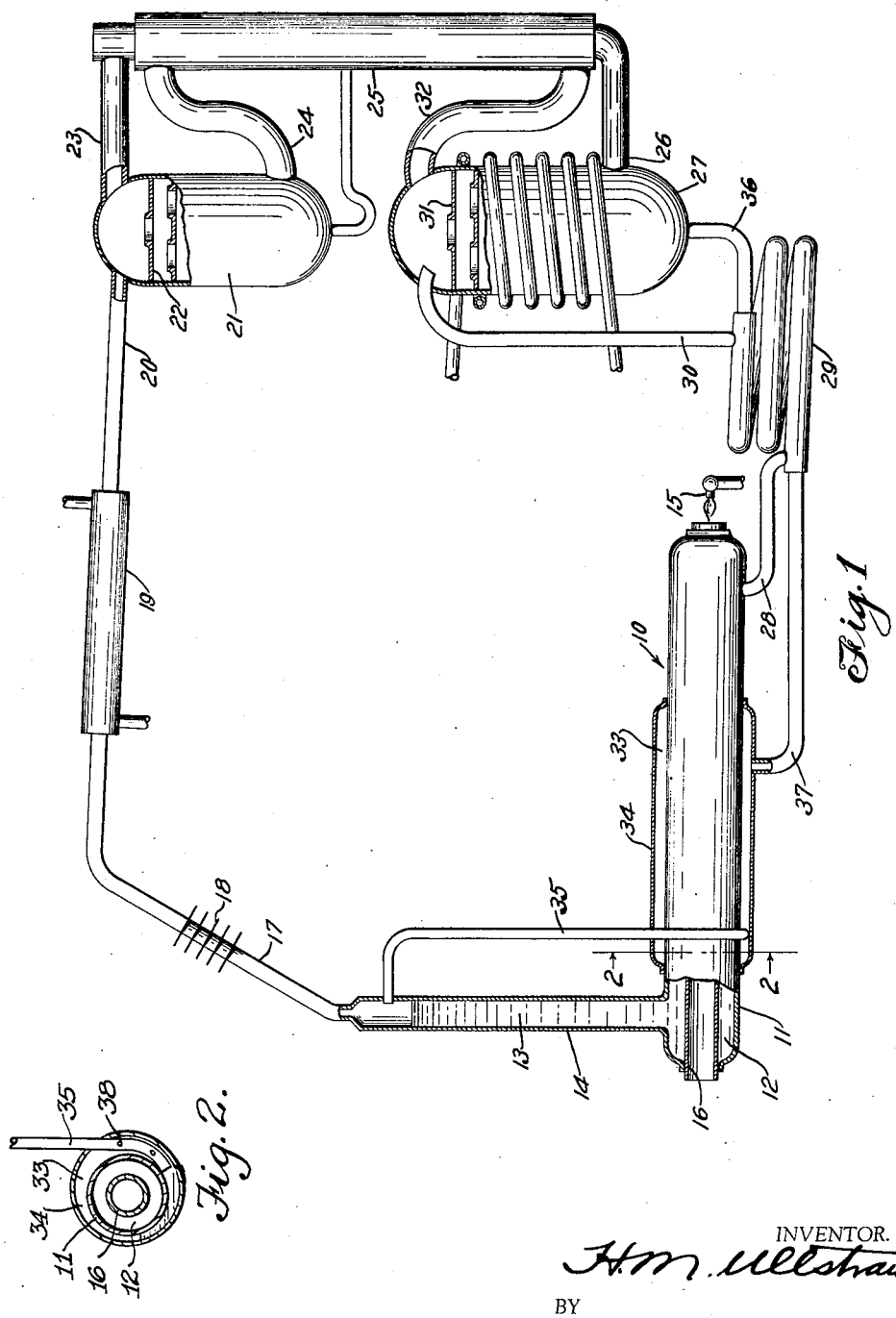

Aug. 18, 1936. H. M. ULLSTRAND 2,051,760
REFRIGERATION
Filed June 7, 1933

INVENTOR.
H. M. Ullstrand
BY
A. Yates Dowell
ATTORNEY.

Patented Aug. 18, 1936

2,051,760

UNITED STATES PATENT OFFICE 2,051,760

REFRIGERATION

Hugo M. Ullstrand, Evansville, Ind., assignor, by mesne assignments, to Servel, Inc., Dover, Del., a corporation of Delaware Application June 7, 1933, Serial No. 674,615

7 Claims. (Cl. 62—119.5)

This invention relates to absorption refrigeration systems and more particularly to circulation of absorption solution in such systems.

There is contemplated an absorption refrigeration system of the pressure equalized type having a generator and separate absorber between which absorption solution is circulated by the action of gas bubbles in a narrow pipe, the solution from the absorber being heated to expel vapor which raises the solution into the generator in which the liquid level is higher than in the absorber. In accordance with this invention there is effected an increase in liquid head, which latter is referred to as the reaction or pumping head, without lowering the generator system, and the possibility of direct application of heat to a dry wall of the generator, referred to as "dry boiling", is eliminated. Furthermore, the rate of liquid circulation is not affected when adjusting the position of the heating element.

Other objects and advantages of the invention will be apparent from the following description taken in connection with the accompanying drawing, in which, Fig. 1 shows schematically a refrigeration system embodying the invention; and Fig. 2 is a section taken on line 2—2 in Fig. 1.

Referring to the drawing, a generator 10 comprises a horizontally elongated vessel 11 having a weak solution chamber 12 communicating at one end with the lower end of a vertical chamber 13 formed by a standpipe 14. The generator is heated by suitable means such as a gas burner 15 in a flue 16 which extends horizontally through the vessel 11.

The generator contains a suitable solution of refrigerant in a liquid absorbent, such as ammonia in water. Due to heating in the generator, ammonia vapor is expelled from solution and flows from the upper end of the standpipe 14 in conduit 17 through rectifier 18 to a condenser 19. In the latter, the ammonia vapor is condensed to liquid which drains through conduit 20 into an evaporator 21 where it flows downwardly over baffle plates 22, evaporating by diffusion into a pressure equalizing gas such as hydrogen, which enters the evaporator through conduit 24.

The resulting gas mixture flows from the evaporator through conduit 23, gas heat exchanger 25, and conduit 26 into an absorber 27. Weak solution from which ammonia vapor has been expelled in the generator flows from vessel 11 through conduit 28, liquid heat exchanger 29, and conduit 30 into the upper part of the absorber 27 where it flows downwardly over baffles 31, absorbing ammonia vapor out of the gas in the absorber. The weak gas returns from the absorber to the evaporator through conduit 32, gas heat exchanger 25, and conduit 24, completing the gas circuit.

Enriched absorption solution accumulates in the lower part of the absorber 27 from where it is to be returned to the generator in which the liquid stands at a higher level in the standpipe 14. In accordance with this invention, a strong solution or circulation chamber 33 is formed by a jacket 34 around the outside of vessel 11. From within chamber 33, a gas-liquid lift conduit 35 extends to the upper end of the generator standpipe 14.

From the lower part of the absorber 27, enriched absorption solution flows through conduit 36, liquid heat exchanger 29, and conduit 37 into chamber 33. In the latter, heat is supplied to the solution dependent upon the difference in temperatures in chambers 12 and 33. Due to this heating, ammonia vapor is expelled from solution and raises the solution from chamber 33 through the rising conduit 35 into the generator standpipe 14, thus completing the liquid circuit. The liquid level in chamber 33 may be determined by providing a hole 38 in the lower end of the conduit 35 in chamber 33, as well known in the art.

In the above described arrangement, the strong solution or circulation chamber 33 of the generator is completely separated from the heating flue 16 by the liquid in chamber 12 and due to the heat storage capacity of the latter, receives heat at a very steady rate, and since the rate of liquid flow through conduit 35 depends upon the rate of heat transfer to liquid in chamber 33, there is maintained a steady rate of liquid circulation in the system. Also due to the heat storage capacity of liquid in chamber 12, the rate of circulation is not affected by adjustment of the gas burner 15 with respect to the flue 16 during operation of the system. Since the heating flue 16 is at all times covered by liquid in chamber 12 regardless of the liquid level in chamber 33, the hole 38 in the lower end of the conduit 35 may be located below the top of flue 16, thus gaining an additional balancing column of liquid without further lowering the generator with respect to the level of liquid in the absorber.

It will be obvious to those skilled in the art that various other changes may be made in the construction and arrangement without departing from the spirit of the invention and therefore the invention is not limited to what is shown in the drawing and described in the specification but only as indicated in the following claims.

I claim:

1. A generator for absorption refrigeration systems comprising a horizontally elongated vessel, a heating flue extending concentrically through said vessel, a standpipe extending upwardly from one end of said vessel, a jacket forming a chamber around said vessel, and a gas-liquid lift conduit from said chamber to the upper end of said standpipe.

2. A generator for absorption refrigeration systems comprising three horizontally extending tubes forming a heating flue, a chamber for liquid around said flue, and a second chamber for liquid around said first chamber, a standpipe extending upwardly from said first chamber, and a gas-liquid lift conduit from said second chamber to the upper end of said standpipe.

3. A generator for absorption refrigeration systems comprising a vessel having a horizontally elongated lower part adapted to contain absorption liquid, means for heating liquid in said vessel, a second vessel for liquid adapted to accumulate vapor below the normal liquid level in said first vessel and arranged to receive heat from said heating means through liquid in said lower part of said first vessel, and a gas-liquid lift conduit from said second vessel to the upper part of said first vessel.

4. A generator for absorption refrigeration systems comprising a vessel having a horizontally elongated lower part adapted to contain absorption liquid, means for heating liquid in said vessel, means including a vapor trap forming a chamber for liquid below the normal liquid level in said vessel and arranged to be heated by transfer of heat from liquid in said lower part of said vessel, and a gas-liquid lift conduit from said chamber to the upper part of said vessel.

5. An absorption refrigeration system including a generator having a horizontally elongated lower part adapted to contain absorption liquid, means for heating liquid in said generator, an absorber connected to receive absorption liquid by overflow from said generator, a vessel forming a vapor trap below the liquid level in said generator, said vessel being arranged to be heated by transfer of heat from liquid in said lower part of said generator and connected to receive liquid from said absorber, and a gas-liquid lift conduit from said vessel to the upper part of said generator.

6. A generator for absorption refrigeration systems comprising a vessel adapted to contain absorption liquid, means for heating liquid in said vessel, a second vessel for liquid external to said first vessel and arranged to receive heat entirely through liquid in said first vessel, and a gas-liquid lift conduit extending upwardly from said second vessel to the upper part of said first vessel.

7. A generator for absorption refrigeration systems comprising a vessel adapted to contain absorption liquid, means for heating said vessel, said vessel being constructed and arranged so that walls thereof directly heated by said means are completely submerged by absorption liquid, a second vessel for liquid adapted to accumulate vapor below the normal liquid level in said first vessel and arranged to receive heat through liquid in said first vessel, and a gas-liquid lift conduit extending upwardly from said second vessel to the upper part of said first vessel.

HUGO M. ULLSTRAND.